(12) United States Patent
Tao et al.

(10) Patent No.: US 12,345,392 B2
(45) Date of Patent: Jul. 1, 2025

(54) BACKLIGHT MODULE, DISPLAY MODULE AND DISPLAY APPARATUS

(71) Applicants: Hefei Xinsheng Optoelectronics Technology Co., Ltd., Anhui (CN);
BOE TECHNOLOGY GROUP CO., LTD., Beijing (CN)

(72) Inventors: Ran Tao, Beijing (CN); Haifeng Xu, Beijing (CN); Xiaojun Wu, Beijing (CN); Xiaochun Shi, Beijing (CN)

(73) Assignees: Hefei Xinsheng Optoelectronics Technology Co., Ltd., Anhui (CN);
BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,229

(22) PCT Filed: Apr. 29, 2022

(86) PCT No.: PCT/CN2022/090275
§ 371 (c)(1),
(2) Date: Mar. 29, 2023

(87) PCT Pub. No.: WO2023/206362
PCT Pub. Date: Nov. 2, 2023

(65) Prior Publication Data
US 2024/0360985 A1 Oct. 31, 2024

(51) Int. Cl.
*F21V 17/10* (2006.01)
(52) U.S. Cl.
CPC .................... *F21V 17/10* (2013.01)
(58) Field of Classification Search
CPC ....................................................... F21V 17/10
(Continued)

(56) References Cited

U.S. PATENT DOCUMENTS

2014/0176852 A1* 6/2014 Ha ................... G02F 1/133308
349/58
2016/0349568 A1* 12/2016 Oh ....................... G02B 6/0088
(Continued)

FOREIGN PATENT DOCUMENTS

CN 104267522 A 1/2015
CN 106896581 A 6/2017
(Continued)

*Primary Examiner* — Elmito Breval
*Assistant Examiner* — Hana S Featherly
(74) *Attorney, Agent, or Firm* — HOUTTEMAN LAW LLC

(57) ABSTRACT

A backlight module, a display module and a display apparatus are provided. The backlight module includes a backlight assembly, a back plate and a middle frame. The back plate is a die casting member and includes a back plate main body on a side away from a light outgoing surface of the backlight assembly and back plate sides around the backlight assembly. The middle frame includes a middle frame main body on a side of the back plate sides close to the backlight assembly. The middle frame further includes first middle frame sides, each of which is connected to the middle frame main body and on a side of the corresponding back plate side close to the backlight assembly; first clamping portions are on a surface of each first middle frame side opposite to the corresponding back plate side; second clamping portions are on a surface of each back plate side opposite to the corresponding first middle frame side, and each first clamping portion is clamped with the corresponding second clamping portion. In the backlight module, the stability of connection between the middle frame and the back plate can be ensured under the conditions of a vibration environment and a high temperature, and the requirements of the narrow frame and the thinness can be satisfied more easily.

17 Claims, 9 Drawing Sheets

(58) Field of Classification Search
USPC .......................................................... 362/97.1
See application file for complete search history.

(56) References Cited

U.S. PATENT DOCUMENTS

| | | | | |
|---|---|---|---|---|
| 2017/0192163 A1* | 7/2017 | Oh | .......................... | G06F 1/1637 |
| 2019/0196251 A1* | 6/2019 | Woo | .................. | G02F 1/133308 |
| 2019/0243059 A1* | 8/2019 | Shin | ........................ | G02B 6/005 |

FOREIGN PATENT DOCUMENTS

| | | | |
|---|---|---|---|
| CN | 107289371 | A | 10/2017 |
| CN | 108508670 | A | 9/2018 |
| CN | 207908836 | U | 9/2018 |
| CN | 208888530 | U | 5/2019 |
| CN | 209373286 | U | 9/2019 |
| CN | 209803517 | U | 12/2019 |
| CN | 211603781 | U | 9/2020 |
| CN | 212410981 | U | 1/2021 |
| CN | 113625480 | A | 11/2021 |
| CN | 214669968 | U | 11/2021 |
| CN | 214669977 | U | 11/2021 |
| CN | 214704238 | U | 11/2021 |
| CN | 215416201 | U | 1/2022 |

* cited by examiner

O2-O2

BACKLIGHT MODULE, DISPLAY MODULE AND DISPLAY APPARATUS

TECHNICAL FIELD

The present disclosure relates to the field of display technology, and in particular to a backlight module, a display module and a display apparatus.

BACKGROUND

At present, a die casting member is generally used in vehicles or other scenes with high requirements on the strength of a display apparatus, the die casting member has the advantages of high strength, and can be used to form a more complex external structure through a die-casting process.

A back plate in an existing display apparatus generally adopts the die casting member, and a middle frame is fixed on the back plate through a double-sided adhesive tape. However, under the conditions of a vibration environment and a high temperature, the adhesion of the double-sided adhesive tape may be weakened and even fail, so that the stability of connection between the middle frame and the back plate becomes poor. In addition, the middle frame is required to have an enough thickness and width to prevent the middle frame from deforming, which does not satisfy the requirements of the narrow frame and the thinness.

SUMMARY

The present disclosure is directed to at least one of the technical problems in the prior art, and provides a backlight module, a display module and a display apparatus, which can ensure stability of connection between a middle frame and a back plate under the conditions of a vibration environment and a high temperature, and can satisfy the requirements of the narrow frame and the thinness more easily.

In order to achieve the above object, an embodiment of the present disclosure provides a backlight module, including a backlight assembly, a back plate and a middle frame, the back plate is a die casting member and includes a back plate main body on a side away from a light outgoing surface of the backlight assembly and back plate sides around the backlight assembly; and the middle frame includes a middle frame main body on a side of the back plate sides close to the backlight assembly; and the middle frame further includes first middle frame sides, each of which is connected to the middle frame main body and on a side of the corresponding back plate side close to the backlight assembly; first clamping portions are on a surface of each first middle frame side opposite to the corresponding back plate side; second clamping portions are on a surface of each back plate side opposite to the corresponding first middle frame side, and each first clamping portion is clamped with the corresponding second clamping portion.

In some embodiments, each first clamping portion is a first clamping protrusion portion on a surface of the corresponding first middle frame side opposite to the corresponding back plate side; and each second clamping portion is a clamping recess portion on a surface of the corresponding back plate side opposite to the corresponding first middle frame side.

In some embodiments, the middle frame further includes a second middle frame side connected to the middle frame main body and on a non-light source side of the backlight assembly; and at least one of the other sides of the backlight assembly except the non-light source side is provided with the first middle frame side; and the second middle frame side is on a side of the back plate side corresponding to the second middle frame side away from the backlight assembly; third clamping portions are on a surface of the second middle frame side opposite to the back plate side; fourth clamping portions are on a surface of the back plate side opposite to the second middle frame side, and each third clamping portion is clamped with the corresponding fourth clamping portion.

In some embodiments, each third clamping portion is a through slot in the second middle frame side; and each fourth clamping portion is a second clamping protrusion portion on a surface of the back plate side opposite to the second middle frame side.

In some embodiments, an avoiding recess portion is on the back plate side corresponding to the second middle frame side, and the middle frame main body is connected to the second middle frame side through the avoiding recess portion.

In some embodiments, a first limiting structure is on each first middle frame side, a second limiting structure is on the back plate side corresponding to the first middle frame side; and the first limiting structure and the second limiting structure cooperate with each other, to limit relative positions of the first middle frame side and the back plate side.

In some embodiments, a surface of each back plate side facing the same direction as the light outgoing surface of the backlight assembly is a first surface; each first limiting structure includes bending portions, each of which is bent toward the corresponding back plate side relative to the corresponding first middle frame side; the bending portions are stacked on the first surface, and are staggered from the first clamping portions in an extending direction of the corresponding first middle frame side; and a through hole is formed in each bending portion; and each second limiting structure includes a third limiting protrusion portion on the first surface and in the through hole.

In some embodiments, a width of each third limiting protrusion in a second direction is greater than or equal to 0.4 mm, and the second direction is parallel to the light outgoing surface of the backlight assembly and perpendicular to an extending direction of the corresponding back plate side where the third limiting protrusion is located.

In some embodiments, each second limiting structure further includes a limiting groove in the first surface, and the corresponding third limiting protrusion portion is on a bottom surface of the limiting groove; and each bending portion is in the corresponding limiting groove, and a shape of an orthographic projection of each limiting groove on a plane parallel to the light outgoing surface of the backlight assembly is the same as that of the corresponding bending portion on the plane parallel to the light outgoing surface of the backlight assembly.

In some embodiments, a surface of each back plate side facing the light outgoing surface of the backlight assembly is a first surface; each first limiting structure includes bending portions, each of which is bent toward the corresponding back plate side relative to the corresponding first middle frame side; the bending portions are stacked on the first surface, and are staggered from the first clamping portions in an extending direction of the corresponding first middle frame side; and two extending portions are on both sides of each bending portion in the extending direction of the first middle frame side; and each second limiting structure includes a first limiting groove in the first surface and two second limiting grooves on two sides of the first limiting groove in the extending direction of the back plate side; each second limiting groove is communicated with the first limiting groove; each bending portion is in the corresponding first limiting groove, and the corresponding two extending portions are respectively located in the corresponding two second limiting grooves.

In some embodiments, a support convex plate is on a surface of any one back plate side close to the backlight assembly for supporting the middle frame body.

In an aspect, an embodiment of the present disclosure further provides a display module, which includes a display panel, and the display module further includes the backlight module provided in the embodiments of the present disclosure.

In some embodiments, the display module further includes a cover plate and a structural adhesive, wherein a surface of each back plate side corresponding to the first middle frame side opposite to the cover plate is a first surface; first limiting protrusion portions are on the first surface; and the cover plate is on the light outgoing surface of the backlight assembly and stacked on the first limiting protrusion portions; and the structural adhesive is between the first surface and a surface of the cover plate opposite to the first surface, and located on a side of each first limiting protrusion portion away from the first middle frame side.

In some embodiments, each of the number of the first clamping portions and the number of the second clamping portions is equal to the number of the first limiting protrusion portions, and the first clamping portions, the second clamping portions and the first limiting protrusion portions are in a one-to-one correspondence with each other.

In some embodiments, each clamping recess portion has a first mating surface away from the first surface, and the corresponding first clamping protrusion portion has a second mating surface opposite to the first mating surface, and the second mating surface is mated with the first mating surface; and the first mating surface and a surface of the corresponding first limiting protrusion portion opposite to the cover plate have a distance therebetween.

In some embodiments, the distance is greater than or equal to 0.7 mm.

In some embodiments, a width of an overlapping area where the second mating surface and the first mating surface overlap with each other in a first direction is greater than or equal to 0.4 mm and less than or equal to 0.5 mm, and the first direction is parallel to the light outgoing surface of the backlight assembly and perpendicular to an extending direction of the corresponding back plate side where the first limiting protrusion portions are located.

In some embodiments, a center distance between two adjacent first limiting protrusion portions is greater than or equal to 35 mm and less than or equal to 50 mm.

In some embodiments, a width of each first limiting protrusion portion in a first direction is greater than or equal to 0.6 mm, and the first direction is parallel to the light outgoing surface of the backlight assembly and perpendicular to an extending direction of the corresponding back plate side where the first limiting protrusion portions are located.

In some embodiments, the middle frame further includes a second middle frame side connected to the middle frame main body and on a non-light source side of the backlight assembly; and at least one of the other sides of the backlight assembly except the non-light source side is provided with the first middle frame side; and the second middle frame side is on a side of the back plate side corresponding to the second middle frame side away from the backlight assembly; third clamping portions are on a surface of the second middle frame side opposite to the back plate side; fourth clamping portions are on a surface of the back plate side opposite to the second middle frame side, and each third clamping portion is clamped with the corresponding fourth clamping portion; a surface of the back plate side corresponding to the second middle frame side opposite to the cover plate is a second surface, and second limiting protrusion portions are on the second surface; the cover plate is on a side where the light outgoing surface of the backlight assembly is located and stacked on the second limiting protrusion portions; and each second limiting protrusion portion and the corresponding fourth clamping portion are mutually staggered in an extending direction of the back plate side; and the structural adhesive is between the second surface and a surface of the cover plate opposite to the second surface, and is staggered from the second limiting protrusion portions in the extending direction of the back plate side.

In an aspect, an embodiment of the present disclosure further provides a display apparatus, which includes a display panel and the backlight module provided in the embodiments of the present disclosure.

DETAIL DESCRIPTION OF EMBODIMENTS

Figure 1:
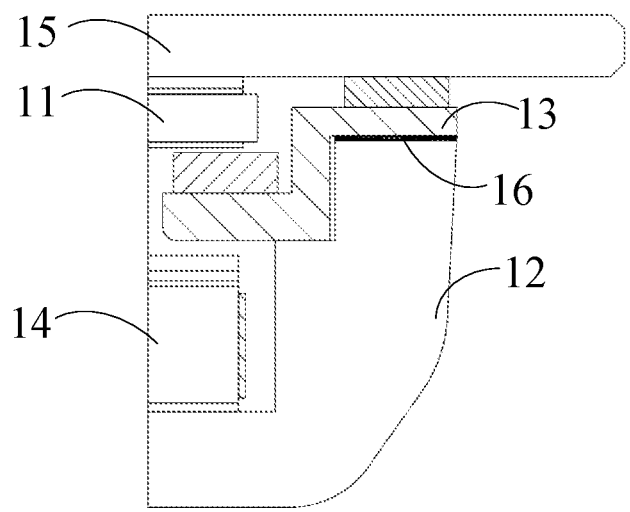
FIG. 1 is a cross-sectional view of a part of a display module in the related art.

In order to make the objects, technical solutions and advantages of the present disclosure more apparent, the present disclosure will be described in further detail below with reference to the accompanying drawings. It is apparent that the described embodiments are only some embodiments of the present disclosure, not all embodiments. All other embodiments, which can be derived by a person skilled in the art from the embodiments of the present disclosure without any creative effort, shall fall within the protection scope of the present disclosure.

Shapes and sizes of the components in the drawings are not to scale, but are merely intended to facilitate an understanding of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The embodiments of the present disclosure are not limited to the embodiments shown in the drawings, but include modifications of configurations formed based on a manufacturing process. Thus, regions illustrated in the drawings have schematic properties, and shapes of the regions shown in the drawings illustrate specific shapes of regions of elements, and the present disclosure is limited thereto.

Referring to FIG. 1, a display module in the related art includes a display panel 11, and a backlight module disposed on a side of the display panel 11 away from a light outgoing surface thereof, where the backlight module includes a backlight assembly 14, a back plate 12, a middle frame 13, and a cover plate 15. The back plate 12 is a die casting member. That is, the back plate 12 is formed in a die casting mode, and thus, has a higher strength than a back plate formed by stamping, and can be used to form a more complex external structure, so that the backlight module can be used in vehicles or other scenes with high requirements on the strength of the backlight module.

However, as shown in FIG. 1, a side of the back plate 12 and a bending portion on the middle frame 13 are fixed together through a double-sided adhesive tape 16, which has the following problems; under the conditions of a vibration environment and high temperature, the adhesion of the double-sided adhesive tape may be weakened or even fail, so that the stability of connection between the middle frame and the back plate becomes poor. In addition, the middle frame is required to have an enough width to prevent the middle frame from shrinking and deforming, which does not satisfy the requirements of the narrow frame and the thinness.

First Embodiment

Figure 2:
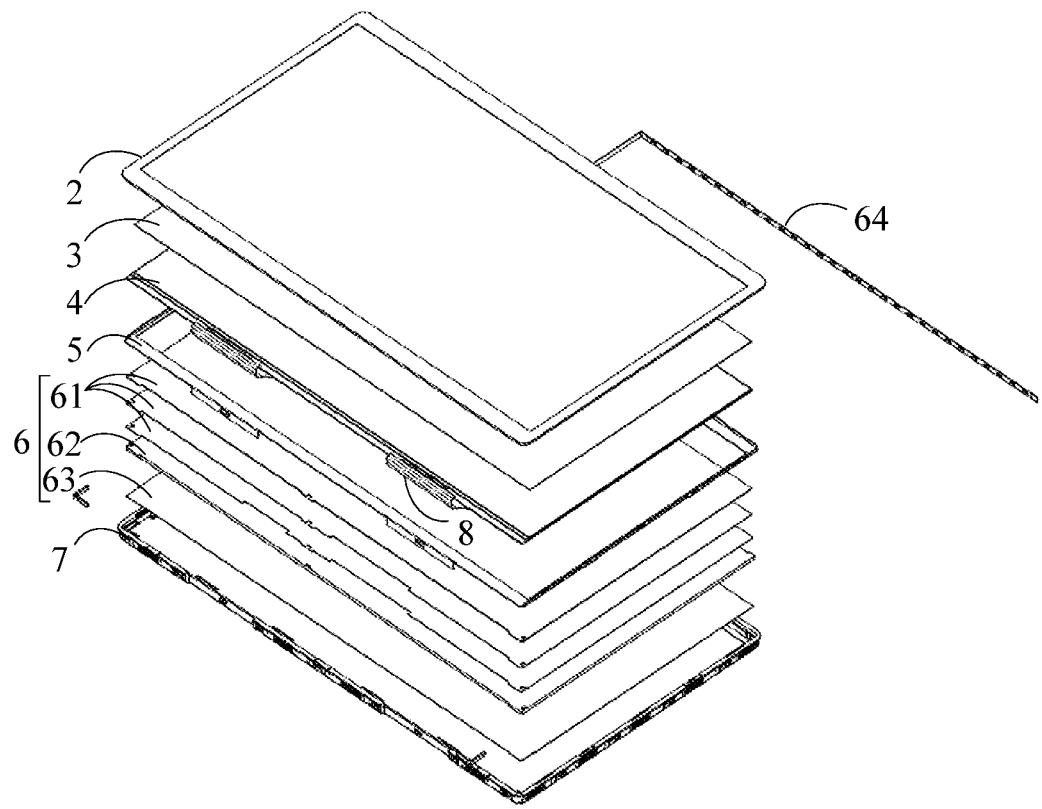
FIG. 2 is an exploded view of a structure of a display module according to a first embodiment of the present disclosure.
Figure 3:
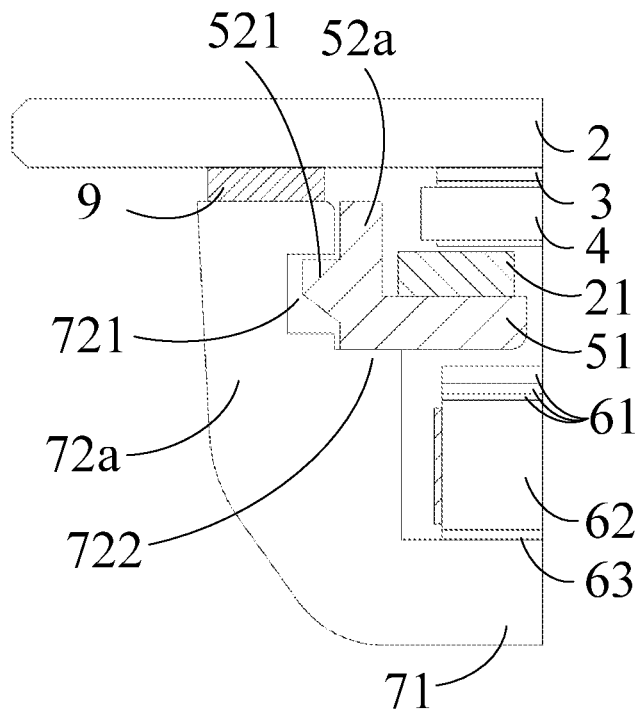
FIG. 3 is a cross-sectional view of a part of a display module according to a first embodiment of the present disclosure.

In order to solve the above problem, referring to FIG. 2 and FIG. 3, the first embodiment of the present disclosure provides a display module, which includes a display panel 4 and a backlight module located on a side away from a light outgoing surface of a backlight assembly 6. In some embodiments, the display module further includes a cover plate 2 having light transmittance and located on a side of the light outgoing surface of the backlight assembly 6 and for protecting the display panel 4. The cover plate 2 may be adhered to the display panel 4 by an optical adhesive 3, for example. In addition, the display panel 4 is electrically connected to a circuit board (not shown) through two flat cables 8. In some optional embodiments, as shown in FIG. 3, an adhesive 9 may be further disposed between the cover plate 2 and a back plate side and used for adhering the cover plate 2 and the back plate side together. The adhesive 9 is, for example, a solid double-sided adhesive tape.

The first embodiment of the present disclosure further provides a backlight module. As shown in FIG. 2, the backlight module includes the backlight assembly 6, the back plate 7 and a middle frame 5. In some optional embodiments, the backlight assembly 6 may include, but is not limited to, an optical layer 61, a light guide plate 62, and a reflective sheet 63 disposed successively in a direction away from the display panel 4. In addition, as shown in FIG. 2, the backlight assembly 6 may further include a side-light type backlight 64 disposed opposite to the light guide plate 62. The arrangement of the side-light type backlight 64 and the light guide plate 62 opposite to each other herein means that the side-light type backlight 64 is opposite to a light incoming surface of the light guide plate 62 perpendicular to a plane where the light outgoing surface of the backlight assembly 6 is located. In practical applications, for example, the optical layer 61 has a light-homogenizing function. The optical layer 61 may include, for example, a multi-layer optical film such as a lower diffusion film for diffusing light, a prism film for improving the brightness of light, or the like. In some embodiments, an upper diffusion film or other functional films may be added. In addition, the backlight assembly 6 may alternatively adopt a backlight type light source, which is not particularly limited by the embodiment of the present disclosure.

Specifically, an outline of the light outgoing surface of the backlight assembly 6 is rectangular or substantially rectangular; an orthographic projection of an outer outline of the display module on a plane where the light outgoing surface of the display panel 4 is located may be rectangular or substantially rectangular; all orthographic projections of outer outlines of the middle frame 5, the back plate 7, and the optical layer 61, the light guide plate 62, and the reflective sheet 63 on the plane where the light outgoing surface of the display panel 4 is located may be rectangular or substantially rectangular. The rectangular shape may include a rounded rectangle, i.e., at least one of four corners of the rectangle is rounded.

The back plate 7 is a die casting member. That is, the back plate 7 is formed in a die casting mode, and thus, has a higher strength than a back plate formed by stamping, and can be used to form a more complex external structure, so that the backlight module can be used in vehicles or other scenes with high requirements on the strength of the backlight module.

As shown in FIG. 3, the back plate 7 includes a back plate main body 71 located on a side away from the light outgoing surface of the backlight assembly 6 (i.e., the reflection sheet 63) and back plate sides (or sides of the back plate) disposed around the backlight assembly 6. The light outgoing surface of the backlight assembly 6 refers to a surface of the backlight assembly 6 opposite to the display panel 4, and the light outgoing surface of the backlight assembly 6 is parallel to the light outgoing surface of the display panel 4. Taking an outline of the light outgoing surface of the backlight assembly 6 being a rectangle as an example, optionally, there are four back plate sides, one back plate side (described in detail later) corresponds to a side where a non-light source side (i.e. a side opposite to the side-light type backlight 64) of the backlight assembly 6 is located, and the other three back plate sides are back plate sides 72a corresponding to the other three sides of the backlight assembly 6 except the non-light source side. In some embodiments, a support convex plate 722 is further provided on a surface of any one of the four back plate sides close to the backlight assembly 6 and used for supporting the middle frame main body 51. A width of the support convex plate 722 in a first direction is greater than or equal to 1 mm, and the first direction is parallel to the light outgoing surface of the backlight assembly 6 and perpendicular to an extending direction of the back plate side where the support convex plate 722 is located.

The middle frame 5 includes the middle frame main body 51. The middle frame main body 51 is located on a side of the back plate sides close to the backlight assembly 6, and a part of the middle frame main body 51 is located between a non-display area of the display panel 4 and an area of the backlight assembly 6 opposite to the non-display area, and is used for supporting the display panel 4 and limiting the optical layer 61, so as to prevent an edge of the optical layer 61 from deforming and tilting, and further to ensure the display effect.

In some optional embodiments, as shown in FIG. 3, a buffer pad 21 may be further disposed between the middle frame main body 51 and the display panel 4 for buffering the display panel 4 to protect the display panel 4, and the buffer pad 21 is, for example, foam, and may be adhered to the middle frame main body 51.

The middle frame 5 further includes first middle frame sides 52a, each of which is connected to the middle frame main body 51 and located on a side of the corresponding back plate side 72a close to the display panel 4. It should be noted that by taking the outline of the light outgoing surface of the backlight assembly 6 being a rectangle as an example, optionally, three first middle frame sides 52a are provided and respectively correspond to the other three sides of the display panel 4 except the non-light source side. First clamping portions are provided on a surface of each first middle frame side 52a opposite to the corresponding back plate side 72a, second clamping portions are correspondingly provided on a surface of the back plate side 72a opposite to the first middle frame side 52a, and each first clamping portion is connected to the corresponding second clamping portion in a clamping manner (each first clamping portion is clamped with the corresponding second clamping portion). In some optional embodiments, as shown in FIG. 3, each first clamping portion is a first clamping protrusion portion 521 disposed on the surface of the first middle frame side 52a opposite to the back plate side 72a; each second clamping portion is a clamping recess portion 721 disposed on the surface of the back plate side 72a opposite to the first middle frame side 52a, and each first clamping protrusion portion 521 is located in the corresponding clamping recess portion 721 and clamped with the clamping recess portion 721, so that the middle frame 5 and the back plate 7 are fixed. The first clamping protrusion portion 521 is, for example, hook-shaped.

It should be noted that the embodiment of the present disclosure is not limited to use the first clamping protrusion portion and the clamping recess portion to realize the clamping connection between the back plate side 72a and the first middle frame side 52a. In practical application, any other clamping structure may also be used, which is not limited in the embodiment of the present disclosure.

In some optional embodiments, a plurality of first clipping portions may be disposed on the first middle frame side 52a, and are distributed at intervals along the extending direction of the first middle frame side 52a. The number of the second clamping portions is the same as that of the first clamping portions, and each second clamping portion is clamped with the corresponding first clamping portion.

Figure 5:
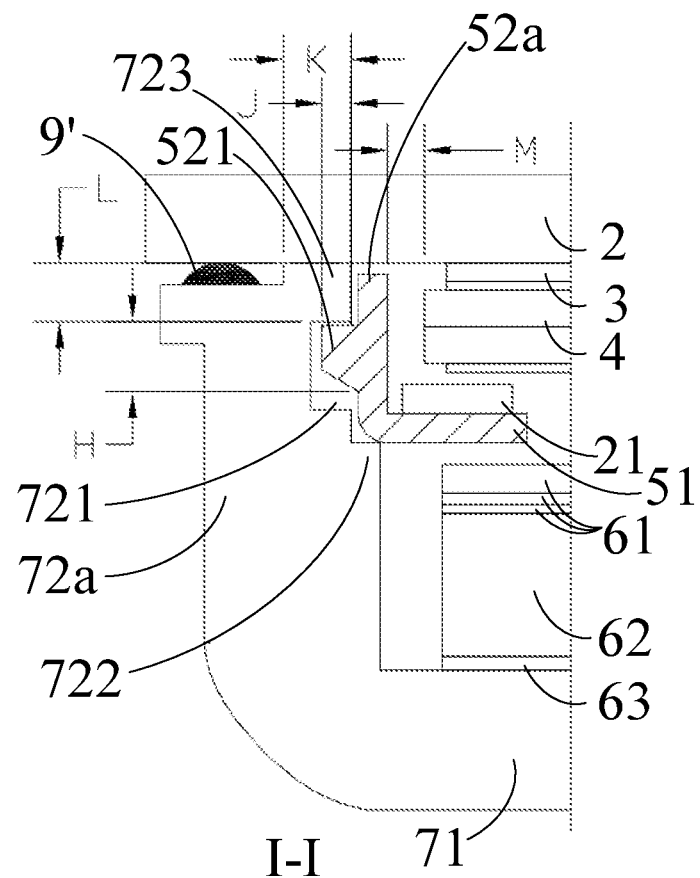
FIG. 5 is a cross-sectional view taken along a line I-I in FIG. 4.
Figure 6:
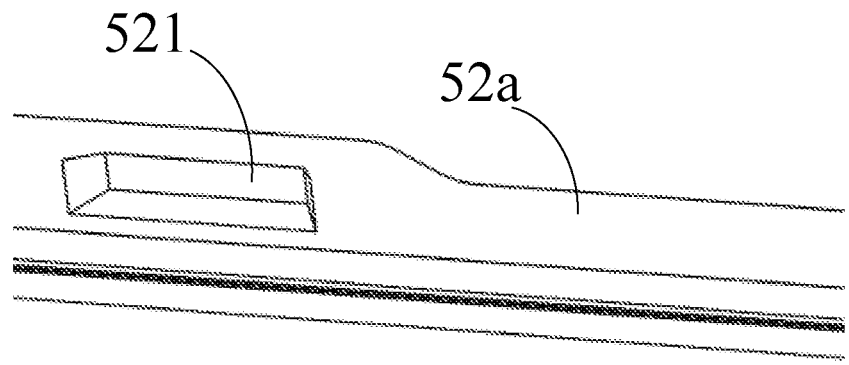
FIG. 6 is a perspective view of a part of a first middle frame side at a first clamping protrusion portion according to a second embodiment of the present disclosure.

In some optional embodiments, as shown in FIG. 5, a maximum thickness H of each first clamping protrusion portion 521 in a direction perpendicular to the light outgoing surface of the backlight assembly 6 is greater than or equal to 0.9 mm, and less than or equal to 1.4 mm. In some embodiments, for convenience of assembly, a difference between an opening size of each clamping recess portion 721 in the direction perpendicular to the light outgoing surface of the backlight assembly 6 and the maximum thickness H of the corresponding first clamping protrusion portion 521 is greater than or equal to 0.4 mm, and less than or equal to 0.9 mm.

In the backlight module according to the embodiment of the present disclosure, each first clamping portion is clamped with the corresponding second clamping portion so that the middle frame 5 and the back plate 7 are fixed. In this way, compared with the prior art, in the embodiment of the present disclosure, the connection stability is ensured without the double-sided adhesive tape, and the stability of connection between the middle frame and the back plate can be still ensured even under the conditions of a vibration environment and a high temperature. In addition, the cost can be saved by omitting the double-sided adhesive tape. In addition, a higher connection stability can be realized by clamping each first clamping portion with the corresponding second clamping portion, so that the deformation of the back plate 7 can be reduced to a certain extent, thereby properly reducing the thickness and the width of the middle frame 5, and satisfying the requirements of the narrow frame and the thinness.

In the display module according to the embodiment of the present disclosure, by adopting the above backlight module according to the embodiment of the present disclosure, the connection stability is ensured without the double-sided adhesive tape, and the stability of connection between the middle frame 5 and the back plate 7 can be still ensured under the conditions of a vibration environment and a high temperature.

Second Embodiment

Figure 4:
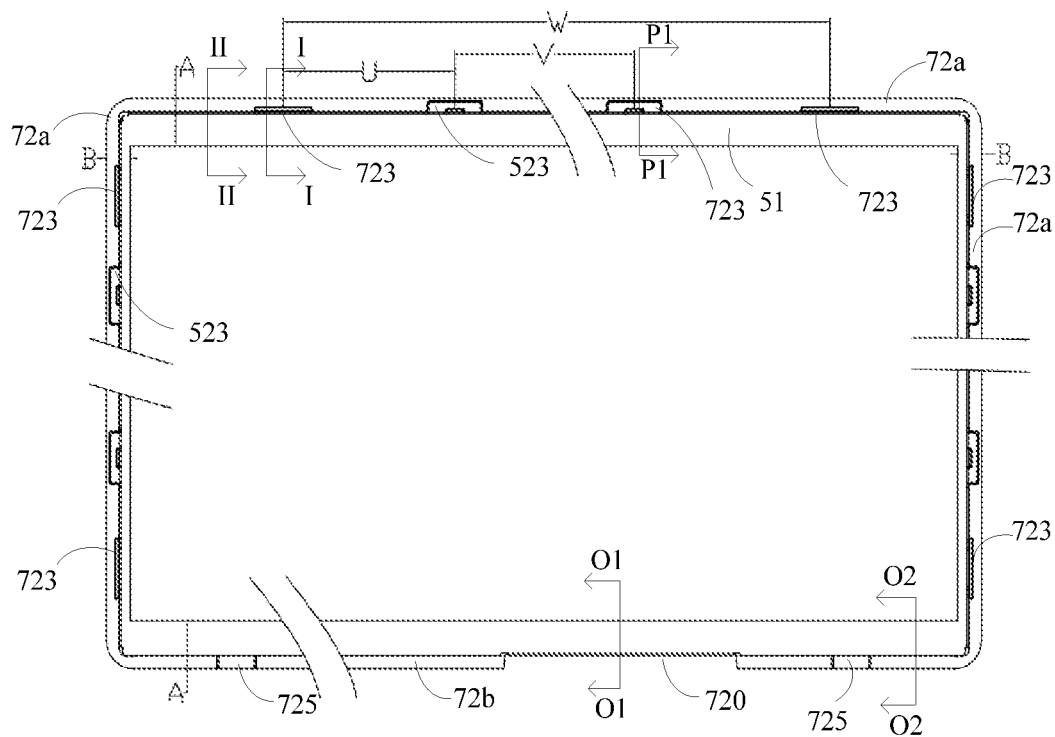
FIG. 4 is a front view of a display module according to a second embodiment of the present disclosure.

Referring to FIG. 4 to FIG. 7, the backlight module provided in the embodiment is a backlight module obtained from improvements on the backlight module in the first embodiment. Specifically, as shown in FIG. 4, taking the outline of the light outgoing surface of the backlight assembly 6 being a rectangle as an example, optionally, there are four back plate sides, one back plate side (the back plate side located on the lower side in FIG. 4) is a back plate side 72b corresponding to the non-light source side of the backlight assembly 6 (i.e., a side where the flat cables 8 of the display panel 4 are located), and the other three back plate sides (the back plate sides located on the upper side, the left side and the right side in FIG. 4) are back plate sides 72a corresponding to the other three sides of the display panel 4 except the non-light source side.

The second embodiment of the present disclosure further provides a display module, unlike the display module in the first embodiment, which adopts a structural adhesive 9' to replace the adhesive 9 in the first embodiment. The cover plate 2 may be adhered to the back plate sides 72a by means of the structural adhesive 9'. The structural adhesive 9' before being cured is liquid, and has a better adhesive effect compared with the solid double-sided adhesive tape. Alternatively, the display modules provided in the first and second embodiments may adopt any one of the adhesive 9 and the structural adhesive 9'.

Figure 7:
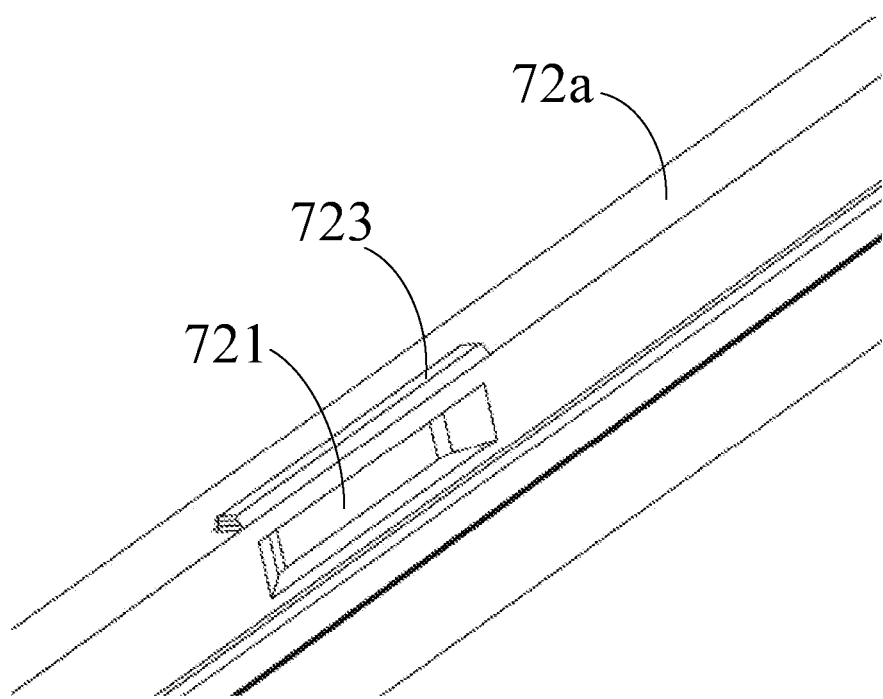
FIG. 7 is a perspective view of a part of a back plate side corresponding to a first middle frame side at a clamping recess portion according to the second embodiment of the present disclosure.
Figure 8:
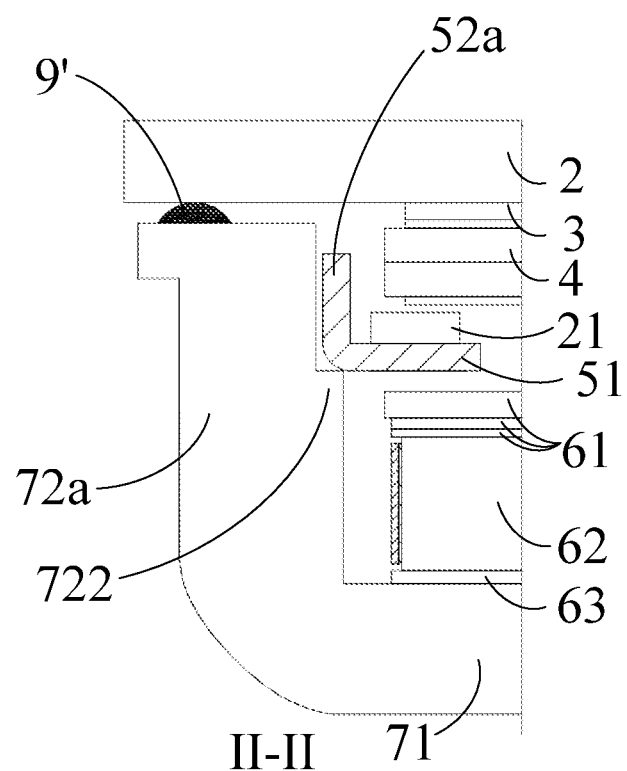
FIG. 8 is a cross-sectional view taken along a line II-II of FIG. 4.

Moreover, a surface of each back plate side 72a corresponding to the first middle frame side 52a opposite to the cover plate 2 is a first surface (i.e., the surface of the back plate side 72a facing upward in FIG. 5); first limiting (position-limiting) protrusion portions 723 are provided on the first surface; and the cover plate 2 is located on the light outgoing surface of the backlight assembly 6 and stacked on the first limiting protrusion portions 723; the structural adhesive 9' is disposed between the first surface and the surface of the cover plate 2 opposite to the first surface, and located on a side of each first limiting protrusion portion 723 away from the first middle frame side 52a. That is, the structural adhesive 9' is continuously arranged on the first surface and along an extending direction of each back plate side 72a. As shown in FIG. 5, the structural adhesive 9' is located outside each first limiting protrusion portion 723 (i.e., on a side away from the first middle frame side 52a) to avoid the first limiting protrusion portion 723. FIG. 8 is a cross-sectional view of the structural adhesive 9' at a position other than the first limiting protrusion portions 723. With the aid of the first limiting protrusion portions 723, on one hand, a distance between the cover plate 2 and each back plate side 72a can be limited, so that a thickness of the structural adhesive 9' can be controlled, and the cover plate 2 and the back plate side 72a can be well adhered to each other; on the other hand, as shown in FIG. 7, optionally, the second clamping portions (i.e., the clamping recess portions 721) may be disposed at a position corresponding to the first limiting protrusion portions 723. For example, orthographic projections of each first limiting protrusion portion 723 and the corresponding second clamping portion on a plane parallel to the light outgoing surface of the backlight assembly 6 at least partially overlaps with each other. Because a distance between a surface of each first limiting protrusion portion 723 opposite to the cover plate 2 and the corresponding clamping recess portion 721 is greater than the distance between the first surface and the clamping recess portion 721, that is, a thickness of the back plate side 72a at the clamping recess portion 721 is increased, the strength at the position can be improved, the requirement of clamping the clamping recess portion 721 and the first clamping protrusion portion 521 on the strength can be met, and the connection stability can be ensured. In addition, with the aid of the first limiting protrusion portions 723, the requirement of clamping the clamping recess portion 721 and the first clamping protrusion portion 521 on the strength can be met without increasing the overall thickness of the back plate 7, so that the overall thickness of the backlight module can be reduced.

In some optional embodiments, as shown in FIG. 5, each clamping recess portion 721 has a first mating surface away from the first surface, and the corresponding first clamping protrusion portion 521 has a second mating surface opposite to the first mating surface, and the second mating surface is mated with the first mating surface, so as to clamp the clamping recess portion 721 and the first clamping protrusion portion 521. Moreover, there is a distance L between the first mating surface and a surface of the corresponding first limiting protrusion portion 723 opposite to the cover plate 2, and the distance L is set to control the thickness of the structural adhesive 9', so as to ensure that the cover plate 2 is well adhered to the back plate side 72a; and to improve the strength at the position, so as to meet the requirement of clamping the clamping recess portion 721 and the first clamping protrusion portion 521 on the strength. In some embodiments, the distance L is greater than or equal to 0.7 mm.

In some optional embodiments, a plurality of first limiting protrusion portion 723 may be included, and are distributed at intervals, for example, along the extending direction of the corresponding back plate side 72a, so as to support the cover plate 2 at a plurality of positions at intervals. In this case, each of the number of the first clamping portions and the number of the second clamping portions is equal to the number of the first limiting protrusion portions 723, and the first clamping portions, the second clamping portions and the first limiting protrusion portions 723 are in a one-to-one correspondence with each other. For example, as shown in FIG. 4, two first limiting protrusion portions 723 are provided on each back plate side 72a.

In some optional embodiments, as shown in FIG. 5, a width J of an overlapping area where the second mating surface and the first mating surface overlap with each other in a first direction is greater than or equal to 0.4 mm and less than or equal to 0.5 mm, and the first direction is parallel to the light outgoing surface of the backlight assembly 6 and perpendicular to an extending direction of the corresponding back plate side 72a where the first limiting protrusion portions 723 are located. By setting the width J within the above numerical range, it is possible to avoid that each first clamping protrusion portion 521 is loosened and the clamping is failed due to the too small width J, and to avoid that each first clamping protrusion portion 521 is difficult to be assembled due to the too great width J.

In some optional embodiments, as shown in FIGS. 4 and 5, a center distance W between two adjacent first limiting protrusion portions 723 (which is applicable when the back plate side 72a is a long side or a short side) is greater than or equal to 35 mm, and less than or equal to 50 mm. By setting the center distance in the above numerical range, it is possible to avoid that the number of the clamping portions (the first clamping portions and the second clamping portions) is greater due to the too small center distance so that the clamping portions are difficult to be assembled; and to avoid that the number of the clamping portions (the first clamping portions and the second clamping portions) is insufficient due to the too great center distance so that the clamping portions are easily loosened.

In some optional embodiments, as shown in FIG. 5, a width K of each first limiting protrusion portion 723 in the first direction is greater than or equal to 0.6 mm, and the first direction is parallel to the light outgoing surface of the backlight assembly 6 and perpendicular to an extending direction of the corresponding back plate side 72a where the first limiting protrusion portions 723 are located. By setting the width K within the above numerical range, the first limiting protrusion portions 723 can be prevented from scratching the cover plate 2 due to the too small width K, and the support area and the support stability can be increased.

It should be noted that the numerical range provided in the above embodiments may be applicable to a display module having any specification, which is not particularly limited. For example, a diagonal dimension of a display area of the display panel 4 may be greater than or equal to 12 inches, and less than or equal to 20 inches.

Figure 9:
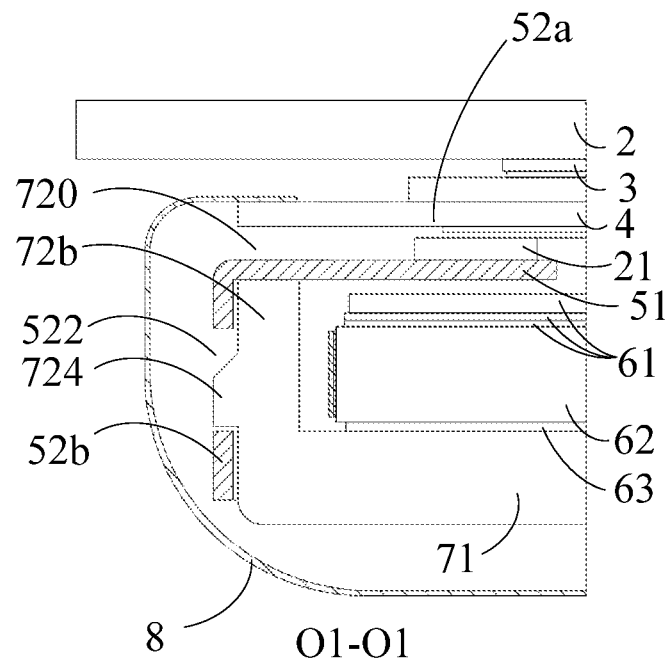
FIG. 9 is a cross-sectional view taken along a line O1-O1 in FIG. 4.
Figure 10:
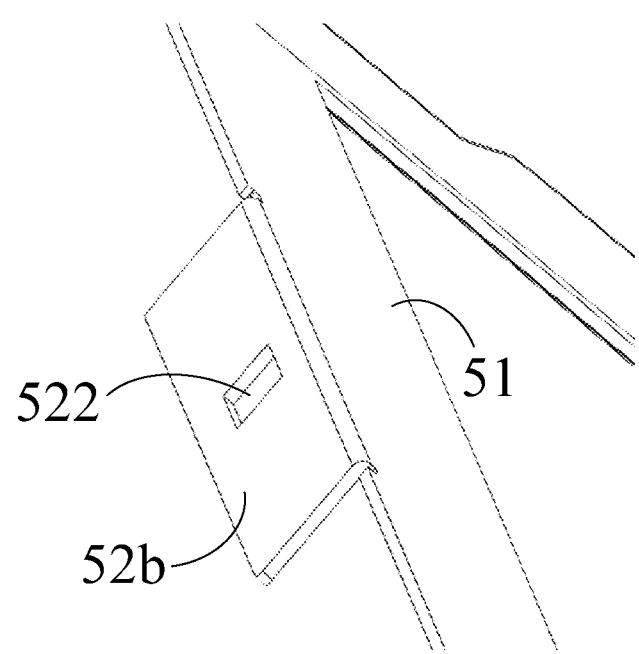
FIG. 10 is a perspective view of a part of a second middle frame side at a through slot according to the second embodiment of the present disclosure.
Figure 11:
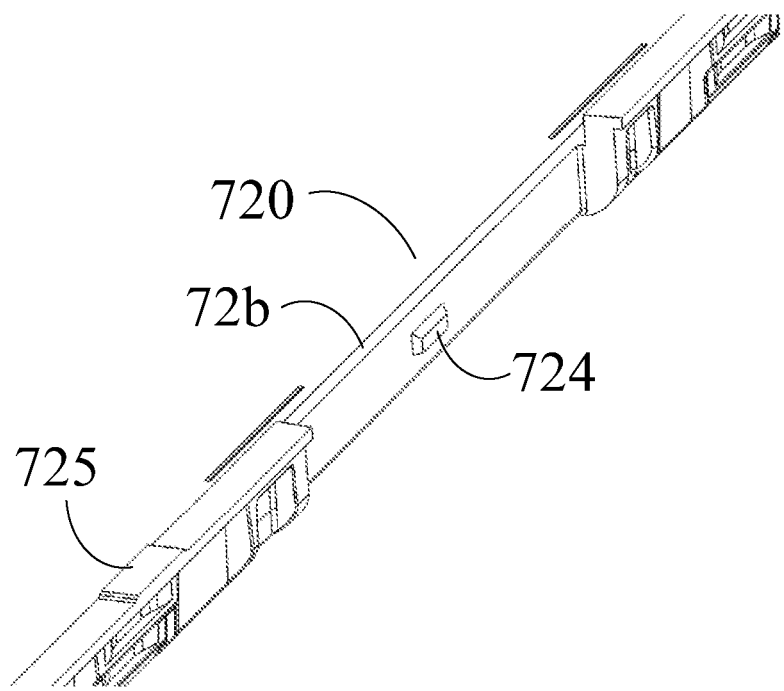
FIG. 11 is a perspective view of a part of a back plate side corresponding to a second middle frame side at a second clamping protrusion portion according to the second embodiment of the present disclosure.

In some optional embodiments, referring to FIGS. 9 to 11, the middle frame 5 further includes a second middle frame side 52b connected to the middle frame main body 51 and located on a side where the flat cables 8 of the display panel 4 are located. By taking the outline of the light outgoing surface of the backlight assembly 6 being a rectangle, optionally, the number of the first middle frame sides 52a is three, and the three first middle frame sides correspond to the other three sides of the backlight assembly 6 except the non-light source side, respectively. Alternatively, in practical applications, according to different outlines of the light outgoing surface of the backlight assembly 6 or other specific requirements, the number of the first middle frame sides 52a can be any other value, and the first middle frame sides 52a may be located on any one of the other sides of the backlight assembly 6 except the non-light source side, and the second middle frame side 52b is located on the non-light source side of the backlight assembly 6, that is, the side where the flat cables 8 of the display panel 4 are located. In addition, the back plate side 72b corresponds to the non-light source side of the backlight assembly 6.

As shown in FIG. 9, the second middle frame side 52b is located on a side of the back plate side 72b corresponding to the second middle frame side away from the backlight assembly 6 (i.e., located outside the back plate side 72b), and third clamping portions are disposed on a surface of the second middle frame side 52b opposite to the back plate side 72b, and fourth clamping portions are disposed on a surface of the back plate side 72b opposite to the second middle frame side 52b, and each third clamping portion is clamped with the corresponding fourth clamping portion, so as to fix the middle frame 5 and the back plate 7. In some optional embodiments, as shown in FIG. 9, each third clamping portion is a through slot 522 disposed in the second middle frame side 52b; each fourth clamping portion is a second clamping protrusion portion 724 disposed on a surface of the back plate side 72b opposite to the second middle frame side 52b. Each second clamping protrusion portion 724 is, for example, hook-shaped.

It should be noted that the embodiment of the present disclosure is not limited to use each second clamping protrusion portion 724 and the corresponding through slot 522 to realize clamping of the back plate side 72b and the second middle frame side 52b. In practical applications, any other clamping structure may also be used, which is not particularly limited in the embodiment of the present disclosure.

In some optional embodiments, a plurality of third clamping portions may be disposed in the second middle frame side 52b, and are distributed at intervals along an extending direction of the second middle frame side 52b. The number of fourth clamping portions is the same as the number of third clamping portions, and each third clamping portion is clamped with the corresponding fourth clamping portion.

In some optional embodiments, as shown in FIG. 9, the third and fourth clamping portions are located on a side (i.e., an inner side) of the flat cables 8 close to the back plate side 72b.

In some optional embodiments, as shown in FIGS. 4, 9 and 11, an avoiding recess portion 720 is provided on the back plate side 72b corresponding to the second middle frame side 52b, and the middle frame main body 51 is connected to the second middle frame side 52b through the avoiding recess portion 720.

Figure 12:
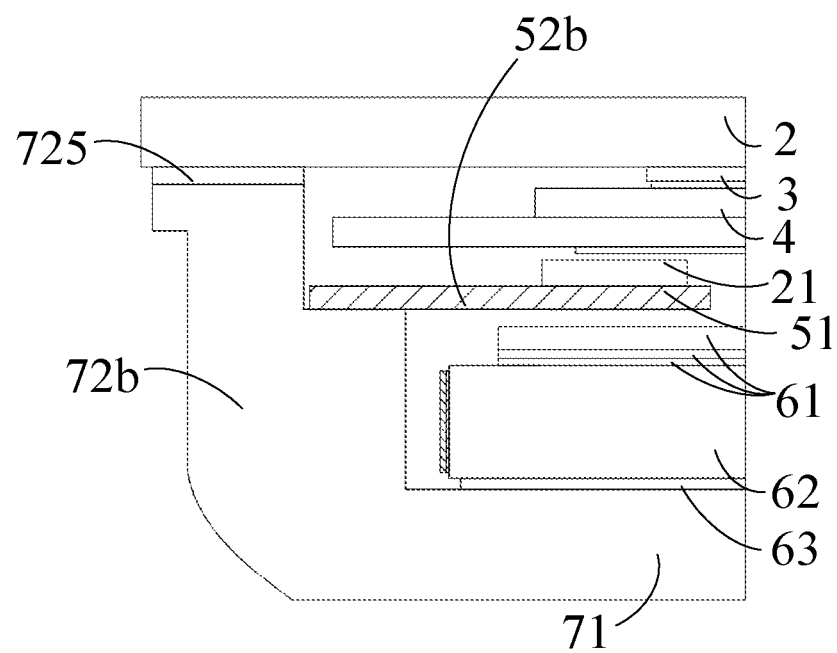
FIG. 12 is a cross-sectional view taken along a line O2-O2 in FIG. 4.

In some optional embodiments, as shown in FIGS. 4 and 12, a surface of the back plate side 72b corresponding to the second middle frame side 52b opposite to the cover plate 2 is a second surface (i.e., the surface of the back plate side 72b facing upward in FIG. 9), and second limiting protrusion portions 725 are provided on the second surface; the cover plate 2 is positioned on a side where the light outgoing surface of the backlight assembly 6 is located and stacked on the second limiting protrusion portions 725; each second limiting protrusion portion 725 and the corresponding fourth clamping portion (i.e., the second clamping protrusion portion 724) are mutually staggered in the extending direction of the back plate side 72b to avoid the flat cables 8. The function of the second limiting protrusion portions 725 is the same as that of the first limiting protrusion portions 723, and thus, the description thereof is omitted.

The structural adhesive 9' is disposed between the second surface of the back plate side 72b and a surface of the cover plate 2 opposite to the second surface, and is staggered from the second limiting protrusion portions 725 in the extending direction of the back plate side 72b. In this way, a width of each second limiting protrusion portion 725 in the first direction may be increased, and may be, for example, the same as a width of the back plate side 72b in the first direction. The first direction is parallel to the light outgoing surface of the backlight assembly 6 and perpendicular to an extending direction of the back plate side 72b where the second limiting protrusion portions 725 are located.

In the backlight module according to the embodiment of the present disclosure, each third clamping portion is clamped with the corresponding fourth clamping portion so that the middle frame 5 and the back plate 7 are fixed. In this way, the connection stability is ensured without the double-sided adhesive tape, and the stability of connection between the middle frame 5 and the back plate 7 can be still ensured even under the conditions of a vibration environment and a high temperature.

Due to the structural characteristics of the middle frame 5, the formed middle frame will deform to a certain extent, a magnitude of the amount of the deformation is related to a size of the middle frame 5, that is, the larger the size of the middle frame 5 is, the larger the amount of deformation is. The middle frame 5 is completely deformed toward the display area, so that a distance M (shown in FIG. 5) between the middle frame 5 and the display panel 4 becomes smaller, resulting the interference. The interference can be avoided by increasing the distance M, but the requirements of the narrow frame and the thinness cannot be satisfied. In order to solve the problem, in some optional embodiments, as shown in FIGS. 13 to 16, a first limiting structure is provided on the first middle frame side 52a, a second limiting structure is provided on the back plate side 72b corresponding to the first middle frame side 52a; the first and second limiting structures cooperate with each other, to limit the relative positions of the first middle frame sides 52a and the back plate side 72b. With the aid of the first limiting structure and the second limiting structure, deformation of the middle frame 5 can be eliminated by limiting the first middle frame side 52a after assembly, so that the interference caused by a reduction in the distance M (shown in FIG. 5) between the middle frame 5 and the display panel 4 can be avoided, meanwhile, the distance M does not need to be increased, and the requirements of the narrow frame and the thinness can be satisfied.

Figure 13:
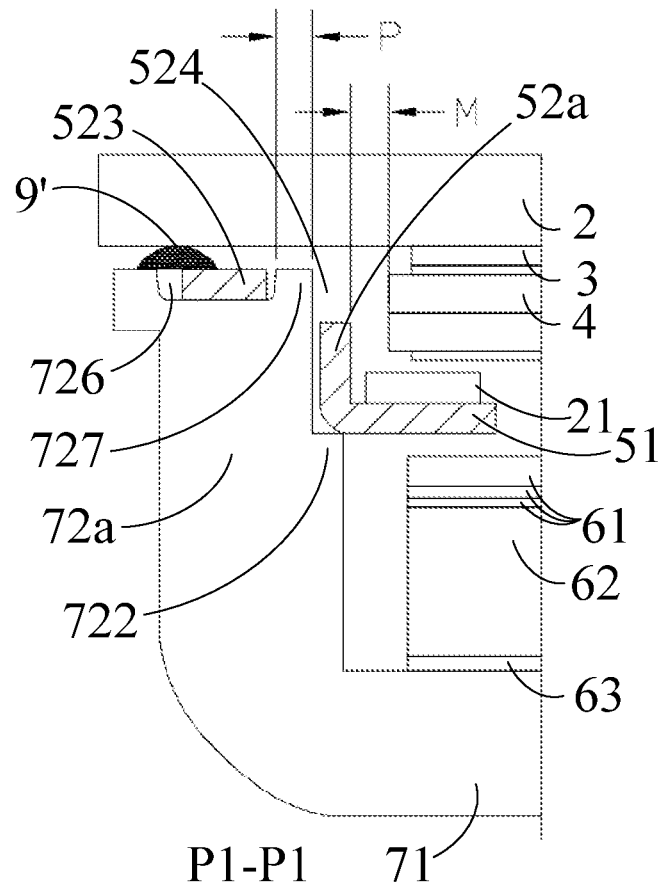
FIG. 13 is a cross-sectional view taken along a line P1-P1 in FIG. 4.
Figure 14:
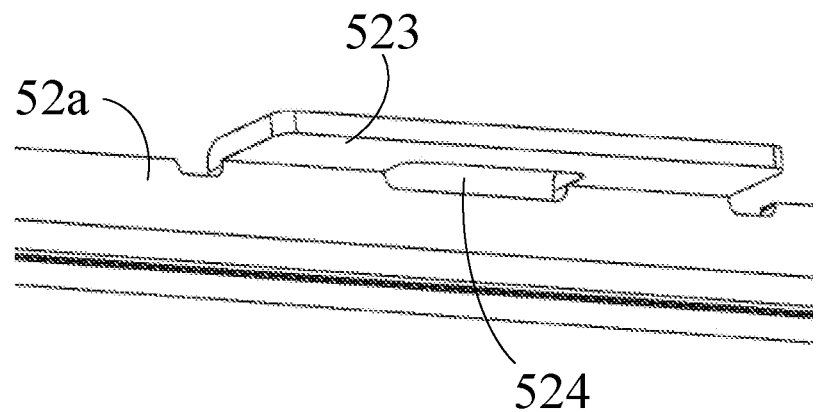
FIG. 14 is a perspective view of a part of a first middle frame side at a bending portion according to the second embodiment of the present disclosure.
Figure 15:
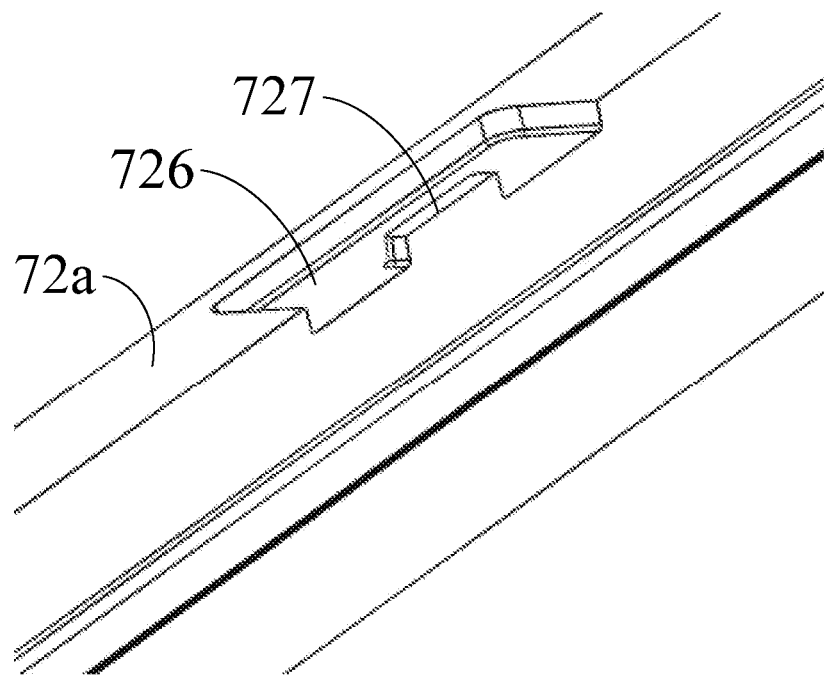
FIG. 15 is a perspective view of a part of a back plate side corresponding to a first middle frame side at a third limiting protrusion portion according to the second embodiment of the present disclosure.

In some optional embodiments, as shown in FIG. 13, a surface of the back plate side 72a facing the same direction as the light outgoing surface of the backlight assembly 6 (i.e., the surface of the back plate side 72a facing upward in FIG. 13) is a first surface. As shown in FIG. 14, the first limiting structure includes bending portions 523, each of which is bent toward the corresponding back plate side 72a relative to the corresponding first middle frame side 52a; the bending portions 523 are stacked on the first surface, and are staggered from the first clamping portions in the extending direction of the corresponding first middle frame side 52a, so that the bending portions 523 and the first clamping portions avoid each other. A through hole 524 is formed in each bending portion 523; as shown in FIG. 15, the second limiting structure includes a third limiting protrusion portion 727 disposed on the first surface and in the through hole 524. The third limiting protrusion portion 727 and the through hole 524 in the bending portion 523 together form a "hanger structure", which can apply a pulling force to the middle frame 5 in a direction close to the back plate side 72a, that is, the middle frame 5 is "pulled outwards", which can eliminate the deformation of the middle frame 5 (the middle frame 5 usually bends towards the display panel) after assembly, so that the interference caused by a reduction in the distance M (shown in FIG. 5) between the middle frame 5 and the display panel 4 can be avoided, meanwhile, the distance M does not need to be increased, and the requirements of the narrow frame and the thinness can be satisfied. For example, as shown in FIG. 4, a frame size A at a long side of the display module is greater than or equal to 9 mm, and a frame size B at a short side is greater than or equal to 4.5 mm, so as to meet the requirement of a narrow frame.

In some embodiments, as shown in FIG. 13, a width P of each third limiting protrusion portion 727 in a second direction is greater than or equal to 0.4 mm, and the second direction is parallel to the light outgoing surface of the backlight assembly 6 and perpendicular to an extending direction of the corresponding back plate side 72a where the third limiting protrusion portions 727 are located. By setting the width P within the above numerical range, it can be ensured that each third limiting protrusion portion 727 have sufficient strength to "hang up" the corresponding bending portion 523, and the difficulty in manufacturing due to the too small width can be avoided.

In some optional embodiments, as shown in FIG. 4, a plurality of bending portions 523 may be provided on each first middle frame side 52a, and spaced apart from each other along the extending direction of the first middle frame sides 52a. In some embodiments, a center distance V between any two adjacent bending portions 523 (which is applicable when the first middle frame side 52a is a long side or a short side) is greater than or equal to 40 mm, and is less than or equal to 60 mm. By setting the center distance V in the numerical range, the poor limiting effect due to the too great center distance V can be avoided, and the difficulty in assembling due to the too small center distance V can be avoided. In some embodiments, the bending portions 523 and the first clamping portions are mutually staggered in the extending direction of the corresponding first middle frame side 52a, and a center distance U between each bending portion 523 and the first clamping portion adjacent to the bending portion 523 (which is applicable when the first middle frame side 52a is a long side or a short side) is greater than or equal to 30 mm and less than or equal to 50 mm.

Figure 16:
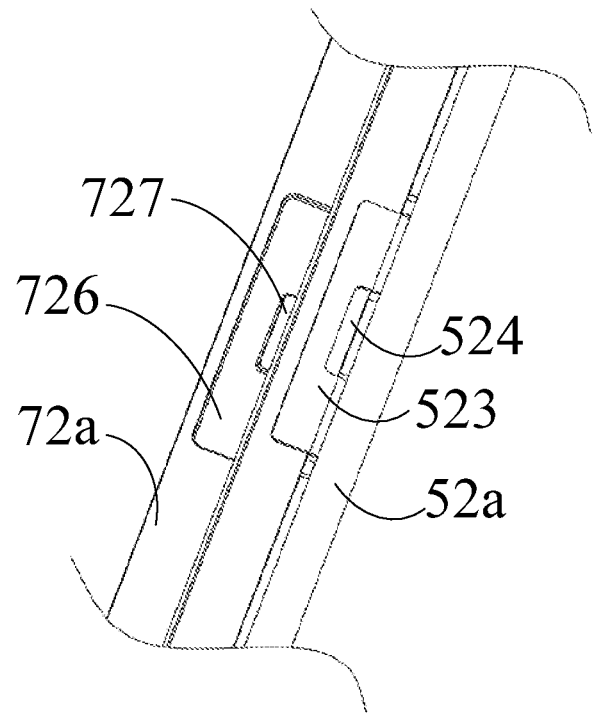
FIG. 16 is an exploded view of a part of a first middle frame side and a back plate side according to the second embodiment of the present disclosure.

In some optional embodiments, as shown in FIGS. 13 and 15, the second limiting structure further includes a limiting groove 726 disposed in the first surface of each back plate side 72a, and the corresponding third limiting protrusion portion 727 is disposed on a bottom surface of the limiting groove 726; as shown in FIG. 16, each bending portion 523 is located in the corresponding limiting groove 726, and a shape of an orthographic projection of each limiting groove 726 on a plane parallel to the light outgoing surface of the backlight assembly 6 is the same as that of the corresponding bending portion 523 on the plane parallel to the light outgoing surface of the backlight assembly 6. The bending portion 523 can be limited by the corresponding limiting groove 726, so that the stability of connection between each third limiting protrusion portion 727 and the through hole 524 in the corresponding bending portion 523 can be further improved.

In some optional embodiments, the first limiting structure and the second limiting structure may be disposed on any one of the other three sides of the backlight assembly 6 except the non-light-source side. It should be noted that in order to avoid the flat cables 8, the first limiting structure and the second limiting structure are not disposed on the non-light source side of the backlight assembly 6, that is, the side where the flat cables 8 of the display panel 4 are located. However, the embodiment of the present disclosure is not limited thereto. In practical applications, if there is enough space on the side where the non-light source side of the backlight assembly 6 is located, the first limiting structure and the second limiting structure may also be disposed on the side, which is not particularly limited by the present disclosure.

Figure 17:
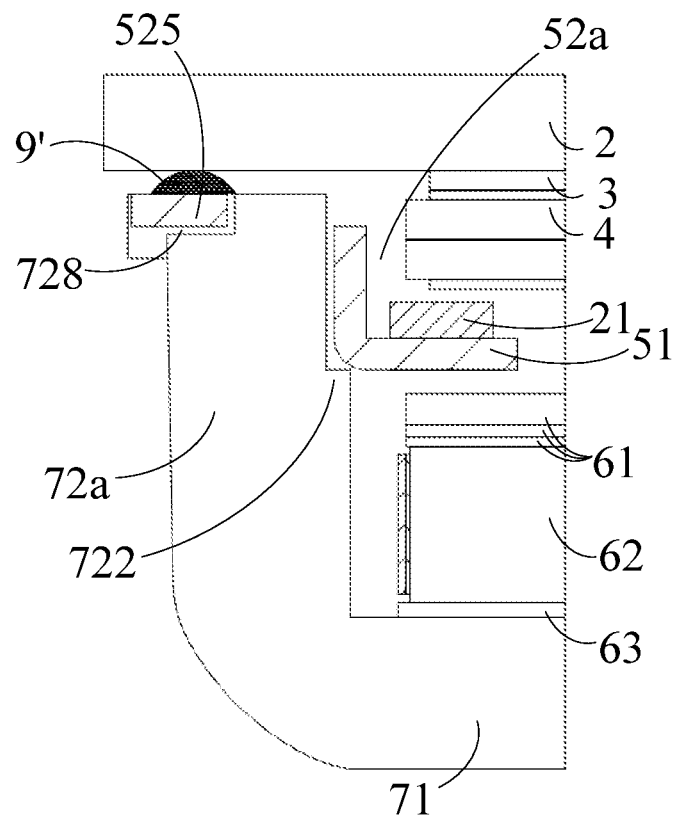
FIG. 17 is a cross-sectional view of a part of a display module according to a modified embodiment of the second embodiment of the present disclosure.
Figure 18:
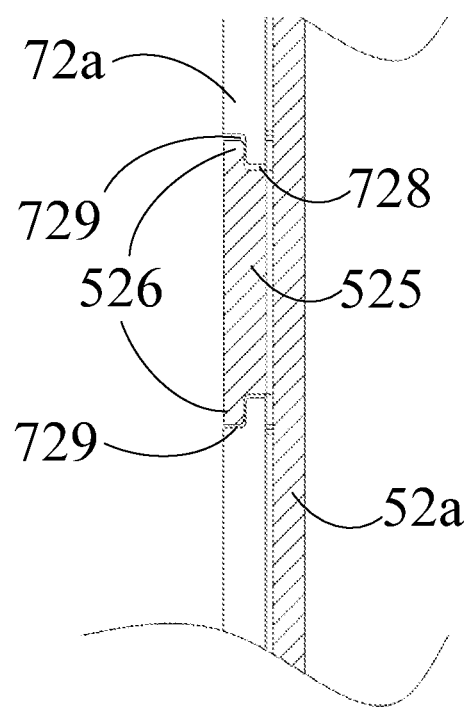
FIG. 18 is a schematic diagram illustrating a matching relationship between a first middle frame side and a back plate side at a bending portion according to a modified embodiment of the second embodiment of the present disclosure.

As a modified embodiment of the present disclosure, as shown in FIGS. 17 and 18, a surface of the back plate side 72a facing the same direction as the light outgoing surface of the backlight assembly 6 (i.e., the surface of the back plate side 72a facing upward in FIG. 13) is a first surface. The first limiting structure includes bending portions 525, each of which is bent toward the corresponding back plate side 72a relative to the corresponding first middle frame side 52a; the bending portions 525 are stacked on the first surface, and are staggered from the first clamping portions in the extending direction of the corresponding first middle frame side 52a, so that the bending portions 525 and the first clamping portions avoid each other. Two extending portions 526 are respectively provided on both sides of each bending portion 525 in the extending direction of the first middle frame side 52a; the second limiting structure includes a first limiting groove 728 arranged in the first surface and two second limiting grooves 729 respectively on two sides of the first limiting groove 728 in the extending direction of the back plate side 72a, and each second limiting groove 729 is communicated with the first limiting groove 728; each bending portion 525 is located in the corresponding first limiting groove 728, and the corresponding two extending portions 526 are respectively located in the corresponding two second limiting grooves 729. Two extending portions 526 cooperate with the corresponding two second limiting grooves 729, respectively, which also can limit the corresponding bending portion 525, thereby forming a "hanger structure", which can apply a pulling force to the middle frame 5 in a direction close to the back plate side 72a, that is, the middle frame 5 is "pulled outwards", which can eliminate the deformation of the middle frame 5 (the middle frame 5 usually bends inwards) after assembly. In this way, the smooth assembly can be ensured and the width of the middle frame 5 can be reduced, and thus, the requirements of the narrow frame and the thinness can be satisfied.

In some optional embodiments, each second limiting groove 729 has an opening on a side away from the middle frame 5, and a sidewall on a side close to the middle frame 5, the sidewall overlaps with the corresponding extending portion 526 in the extending direction of the first middle frame side 52a, thereby playing a limiting role. Alternatively, the embodiment of the present disclosure is not limited thereto. In practical applications, each second limiting groove 729 may also have a sidewall on a side away from the middle frame 5, that is, in a direction perpendicular to the extending direction of the first middle frame side 52a, two sidewalls may limit the extending portion 526 therebetween, thereby playing the limiting role.

To sum up, in the backlight module according to the embodiment of the present disclosure, each first clamping portion is clamped with the corresponding second clamping portion so that the middle frame 5 and the back plate 7 are fixed. In this way, compared with the prior art, in the embodiment of the present disclosure, the connection stability is ensured without the double-sided adhesive tape, and the stability of connection between the middle frame 5 and the back plate 7 can be still ensured even under the conditions of a vibration environment and a high temperature. In addition, the cost can be saved by omitting the double-sided adhesive tape. In addition, a higher connection stability can be realized by clamping each first clamping portion with the corresponding second clamping portion, so that the deformation of the back plate 7 can be reduced to a certain extent, thereby properly reducing the thickness and the width of the middle frame 5, and thus, satisfying the requirements of the narrow frame and the low profile.

In the display module according to the embodiment of the present disclosure, by adopting the above backlight module according to the embodiment of the present disclosure, the connection stability is ensured without the double-sided adhesive tape, and the stability of connection between the middle frame 5 and the back plate 7 can be still ensured under the conditions of a vibration environment and a high temperature.

As another technical solution, an embodiment of the present disclosure further provides a display apparatus, which includes the display module provided in the embodiment of the present disclosure.

The display apparatus in the embodiment of the present disclosure may be used in a vehicle or any other scene with high requirements on the strength of the display apparatus.

In some embodiments, the diagonal dimension of the display area of the display panel 4 may be greater than or equal to 12 inches, and less than or equal to 20 inches.

In the display apparatus according to the embodiment of the present disclosure, by adopting the above display module according to the embodiment of the present disclosure, the connection stability is ensured without the double-sided adhesive tape, and the stability of connection between the middle frame 5 and the back plate 7 can be still ensured under the conditions of a vibration environment and a high temperature.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A backlight module, comprising a backlight assembly, a back plate and a middle frame, wherein the back plate comprises a back plate main body and back plate sides, the back plate main body is arranged on a side away from a light outgoing surface of the backlight assembly, and the back plate sides are arranged around the backlight assembly; and the middle frame comprises a middle frame main body on a side of the back plate sides close to the backlight assembly; and the middle frame further comprises first middle frame sides, each of which is connected to the middle frame main body and on a side of a corresponding back plate side close to the backlight assembly; at least one first clamping portion is arranged on a surface of each first middle frame side opposite to a corresponding back plate side; at least one second clamping portion is on a surface of each back plate side opposite to a corresponding first middle frame side, and each first clamping portion is clamped with a corresponding second clamping portion;

wherein the backlight module further comprises a first limiting structure on the first middle frame side, and a second limiting structure on the back plate side corresponding to the first middle frame side, wherein the first limiting structure and the second limiting structure cooperate with each other, to limit relative positions between the first middle frame side and the back plate side;

wherein a surface of the back plate side facing a same direction as the light outgoing surface of the backlight assembly is a first surface;

the first limiting structure comprises a bending portion, which is bent toward the back plate side relative to the first middle frame side; the bending portion is stacked on the first surface, and is staggered from the first clamping portion in an extending direction of the first middle frame side; and a through hole is formed in the bending portion; and the second limiting structure comprises a third limiting protrusion portion on the first surface, and the third limiting protrusion portion is in the through hole.

2. The backlight module according to claim 1, wherein the first clamping portion is a first clamping protrusion portion on a surface of the first middle frame side opposite to the corresponding back plate side; and the second clamping portion is a clamping recess portion on a surface of the back plate side opposite to the corresponding first middle frame side.

3. The backlight module according to claim 1, wherein the middle frame further comprises a second middle frame side connected to the middle frame main body and on a non-light source side of the backlight assembly; and at least one of the other sides of the backlight assembly except the non-light source side is provided with the first middle frame side; and the second middle frame side is on a side of the corresponding back plate side away from the backlight assembly; a third clamping portions is arranged on a surface of the second middle frame side opposite to the back plate side; a fourth clamping portion is on a surface of the back plate side opposite to the second middle frame side, and the third clamping portion is clamped with the fourth clamping portion.

4. The backlight module according to claim 3, wherein the third clamping portion is a through slot in the second middle frame side; and the fourth clamping portion is a second clamping protrusion portion on a surface of the back plate side opposite to the second middle frame side.

5. The backlight module according to claim 3, further comprising an avoiding recess portion arranged on the back plate side corresponding to the second middle frame side,
wherein the middle frame main body is connected to the second middle frame side through the avoiding recess portion.

6. The backlight module according to claim 1, wherein a width of the third limiting protrusion portion in a second direction is greater than or equal to 0.4 mm, and the second direction is parallel to the light outgoing surface of the backlight assembly and perpendicular to an extending direction of the back plate side where the third limiting protrusion portion is located.

7. The backlight module according to claim 1, wherein the second limiting structure further comprises a limiting groove on the first surface, and the third limiting protrusion portion is on a bottom surface of the limiting groove; and
the bending portion is in the limiting groove, and a shape of an orthographic projection of the limiting groove on a plane parallel to the light outgoing surface of the backlight assembly is the same as that of the bending portion on the plane parallel to the light outgoing surface of the backlight assembly.

8. A backlight module, comprising a backlight assembly, a back plate and a middle frame, wherein the back plate comprises a back plate main body and back plate sides, the back plate main body is arranged on a side away from a light outgoing surface of the backlight assembly, and the back plate sides are arranged around the backlight assembly; and the middle frame comprises a middle frame main body on a side of the back plate sides close to the backlight assembly; and
the middle frame further comprises first middle frame sides, each of which is connected to the middle frame main body and on a side of a corresponding back plate side close to the backlight assembly; at least one first clamping portion is arranged on a surface of each first middle frame side opposite to a corresponding back plate side; at least one second clamping portion is on a surface of each back plate side opposite to a corresponding first middle frame side, and each first clamping portion is clamped with a corresponding second clamping portion;
wherein the backlight module further comprises a first limiting structure on the first middle frame side, and a second limiting structure on the back plate side corresponding to the first middle frame side, wherein the first limiting structure and the second limiting structure cooperate with each other, to limit relative positions between the first middle frame side and the back plate side;
wherein a surface of the back plate side facing a same direction as the light outgoing surface of the backlight assembly is a first surface;

the first limiting structure comprises a bending portion, which is bent toward the back plate side relative to the first middle frame side; the bending portion is stacked on the first surface, and is staggered from the first clamping portion in an extending direction of the first middle frame side; and two extending portions are on both sides of the bending portion in the extending direction of the first middle frame side; and
the second limiting structure comprises a first limiting groove on the first surface and two second limiting grooves on two sides of the first limiting groove in the extending direction of the back plate side; each of the two second limiting grooves is communicated with the first limiting groove; the bending portion is in the first limiting groove, and the two extending portions are respectively located in the two second limiting grooves.

9. The backlight module according to claim 1, further comprising a support convex plate on a surface of any of the back plate sides close to the backlight assembly to support the middle frame body.

10. A display module, comprising a display panel and a backlight module, the backlight module comprises a backlight assembly, a back plate and a middle frame, wherein the back plate comprises a back plate main body and back plate sides, the back plate main body is arranged on a side away from a light outgoing surface of the backlight assembly, and the back plate sides are arranged around the backlight assembly; and the middle frame comprises a middle frame main body on a side of the back plate sides close to the backlight assembly; and
the middle frame further comprises first middle frame sides, each of which is connected to the middle frame main body and on a side of a corresponding back plate side close to the backlight assembly; at least one first clamping portion is arranged on a surface of each first middle frame side opposite to a corresponding back plate side; at least one second clamping portion is on a surface of each back plate side opposite to a corresponding first middle frame side, and each first clamping portion is clamped with a corresponding second clamping portion;
wherein the display module further comprises a cover plate and a structural adhesive, wherein
a surface of each of back plate side corresponding to the first middle frame side opposite to the cover plate is a first surface; at least one first limiting protrusion portion is on the first surface; and the cover plate is on the light outgoing surface of the backlight assembly and stacked on the first limiting protrusion portion; and
the structural adhesive is between the first surface and a surface of the cover plate opposite to the first surface, and located on a side of the first limiting protrusion portion away from the first middle frame side.

11. The display module according to claim 10, wherein each of the number of the at least one first clamping portion and the number of the at least one second clamping portion is equal to the number of the at least one first limiting protrusion portion, and the at least one first clamping portion, the at least one second clamping portion and the at least one first limiting protrusion portion are in a one-to-one correspondence with each other.

12. The display module according to claim 11, wherein the clamping recess portion has a first mating surface away from the first surface, and the corresponding first clamping protrusion portion has a second mating surface opposite to the first mating surface, and the second mating surface is mated with the first mating surface; and the first mating surface and a surface of the corresponding first limiting protrusion portion opposite to the cover plate have a distance therebetween.

13. The display module according to claim 12, wherein the distance is greater than or equal to 0.7 mm.

14. The display module according to claim 12, wherein a width of an overlapping area where the second mating surface and the first mating surface overlap with each other in a first direction is greater than or equal to 0.4 mm and less than or equal to 0.5 mm, and the first direction is parallel to the light outgoing surface of the backlight assembly and perpendicular to an extending direction of the corresponding back plate side where the first limiting protrusion portion is located.

15. The display module according to claim 10, wherein a center distance between two adjacent first limiting protrusion portions is greater than or equal to 35 mm and less than or equal to 50 mm; and a width of the first limiting protrusion portion in a first direction is greater than or equal to 0.6 mm, and the first direction is parallel to the light outgoing surface of the backlight assembly and perpendicular to an extending direction of the corresponding back plate side where the first limiting protrusion portion is located.

16. The display module according to claim 10, wherein the middle frame further comprises a second middle frame side connected to the middle frame main body and on a non-light source side of the backlight assembly; and at least one of the other sides of the backlight assembly except the non-light source side is provided with the first middle frame side; and the second middle frame side is on a side of the back plate side corresponding to the second middle frame side away from the backlight assembly; at least one third clamping portion is on a surface of the second middle frame side opposite to the back plate side; at least one fourth clamping portion is on a surface of the back plate side opposite to the second middle frame side, and each of the at least one third clamping portion is clamped with a corresponding fourth clamping portion;

a surface of the back plate side corresponding to the second middle frame side opposite to the cover plate is a second surface, and at least one second limiting protrusion portion is on the second surface; the cover plate is on a side where the light outgoing surface of the backlight assembly is located and stacked on the second limiting protrusion portion; and each of the at least one second limiting protrusion portion and a corresponding fourth clamping portion are staggered from each other in an extending direction of the back plate side; and a structural adhesive is between the second surface and a surface of the cover plate opposite to the second surface, and is staggered from the second limiting protrusion portion in the extending direction of the back plate side.

17. A display apparatus, comprising the display module according to claim 10.

* * * * *